United States Patent [19]

Scholl et al.

[11] 4,284,513
[45] Aug. 18, 1981

[54] PROCESS FOR PREVENTING ENCRUSTATIONS ON SURFACES WHICH ARE IN CONSTANT CONTACT WITH AQUEOUS SOLUTIONS CONTAINING MATTER PRONE TO CRYSTALLIZE

[75] Inventors: Gerhardt Scholl, Spiesen-Elversberg; Friedrich Hofmann, St. Ingbert, both of Fed. Rep. of Germany

[73] Assignees: Saarberg-Hoelter Saarbergwerke A.G.; Umweltstechnik GmbH, both of Saarbrucken, Fed. Rep. of Germany

[21] Appl. No.: 59,358

[22] Filed: Jul. 20, 1979

Related U.S. Application Data

[63] Continuation of Ser. No. 891,408, Mar. 29, 1978, abandoned.

[30] Foreign Application Priority Data

Mar. 28, 1977 [DE] Fed. Rep. of Germany ....... 2713540
Mar. 28, 1977 [DE] Fed. Rep. of Germany ....... 2713544

[51] Int. Cl.³ .......................... C02F 5/12; C02F 5/14; C23F 15/00
[52] U.S. Cl. .................................. 210/699; 210/696; 210/701; 422/1
[58] Field of Search ........... 422/1; 210/57, 58, 198 A, 210/205, 696, 699, 701

[56] References Cited

U.S. PATENT DOCUMENTS

| | | |
|---|---|---|
| 3,288,640 | 11/1966 | Flock . |
| 3,428,557 | 2/1969 | Rivers ...................... 210/57 |
| 3,514,376 | 5/1970 | Salutsky . |
| 3,873,465 | 3/1975 | DiSimone et al. ............ 210/58 |
| 3,880,620 | 4/1975 | Lange et al. ................ 210/58 |
| 3,890,228 | 6/1975 | Hwa et al. .................. 210/58 |
| 3,928,551 | 12/1975 | Booth ........................ 210/58 |
| 3,932,224 | 1/1976 | Hirota et al. . |
| 3,965,003 | 6/1976 | Stanford .................... 210/58 |
| 4,118,318 | 10/1978 | Welder ...................... 210/58 |
| 4,176,057 | 11/1979 | Wheatley et al. ............ 210/58 |

FOREIGN PATENT DOCUMENTS

| | | |
|---|---|---|
| 1810424 | 8/1969 | Fed. Rep. of Germany . |
| 2519939 | 11/1976 | Fed. Rep. of Germany . |
| 772775 | 4/1957 | United Kingdom . |
| 914701 | 1/1963 | United Kingdom . |
| 1034680 | 6/1966 | United Kingdom . |
| 1145386 | 12/1969 | United Kingdom . |
| 1237529 | 6/1971 | United Kingdom . |
| 1258068 | 12/1971 | United Kingdom . |
| 1425197 | 2/1976 | United Kingdom . |

*Primary Examiner*—Bradley Garris
*Attorney, Agent, or Firm*—James C. Wray

[57] ABSTRACT

The present invention is a process for preventing incrustations of surfaces which are in contact with aqueous solutions containing material prone to crystallize by forming a thin, protective film on the surface to be protected.

11 Claims, 1 Drawing Figure

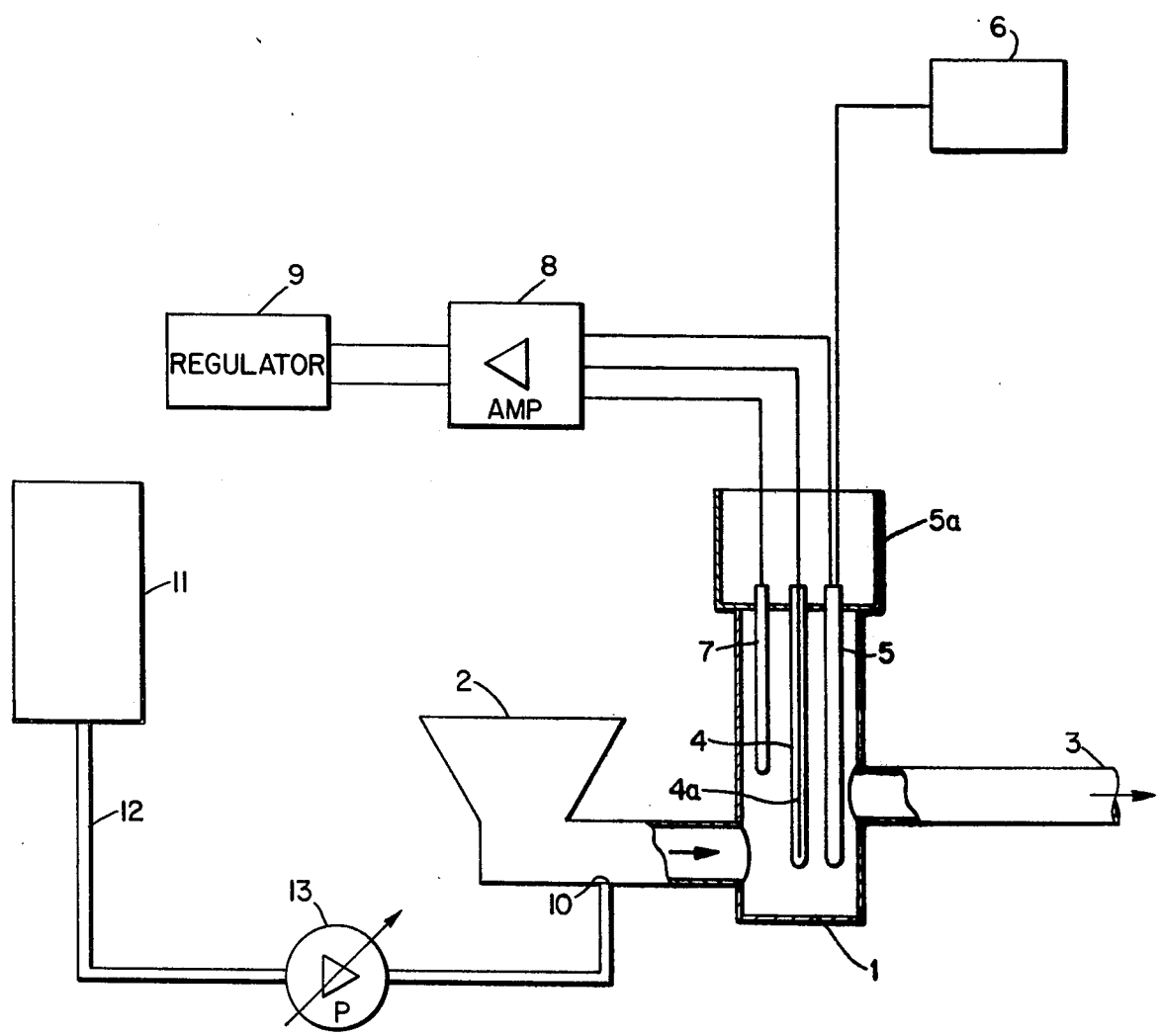

PROCESS FOR PREVENTING ENCRUSTATIONS ON SURFACES WHICH ARE IN CONSTANT CONTACT WITH AQUEOUS SOLUTIONS CONTAINING MATTER PRONE TO CRYSTALLIZE

This is a continuation of application Ser. No. 891,408, filed Mar. 29, 1978, now abandoned.

The invention describes a process for preventing encrustations on surfaces which are in contact with aqueous solutions containing matter prone to crystallize, particularly in flue gas desulfurization plants which use solutions containing alkali-or earth alkali ions as adsorption agents, or in measuring devices which are immsersed into such solutions.

Undesirable encrustations are often formed on surfaces being in contact with aqueous solutions containing matter which may crystallize, e.g. alkali- or earth alkali ions. This is particularly the case in flue gas desulfurization plants which work with aqueous alkali- and/or earth alkalioxide or -hydroxide solutions as adsorption agents. Frequently, salts, especially sulfites, sulfates and carbonates are formed leaving undesirable deposits in apparatus parts and pipes, contributing to blockages and, therefore, severely impair the operational process.

It is also of vital importance that measuring devices for testing physical or chemical properties of solutions, which may contain matter prone to crystallization, e.g. alkali- or earth alkali compounds, not be covered with a crust of crystals precipitating from the solution. Deposits on measuring units could adulterate the measuring results or arrest the measuring process entirely. This could occur, for instance, within inductive flowmeters, membranes of pressure transformers, windows of turbidimeters and densimeters employing radioactive isotope rays. More particularly, it could affect measuring electrodes (sounding electrodes?) for gauging pH values, which gauging is particularly if vital importance in the operation of flue gas desulfurization plants.

The invention pertains to developing a process, which, in a simple manner, prevents encrustations on surfaces which are in contact with solutions containing aqueous crystalline matter, and on measuring devices inserted into such solutions, as in particularly the case in flue gas desulfurization plants.

It is the objective of this invention to solve this problem by supplementing the aqueous solution with a chemical substance which causes a thin protective film to form on the surfaces being in contact with the solution.

The novel process of the invention, as has surprisingly been shown, has prevented almost entirely formation of encrustations or deposits of crystalline matter, as for instance, alkali- or earth alkali compounds on surfaces which come into contact with solutions containing such matter. This is to be attributed to the fact that the protective film on the surfaces, composed of organic substance, prevents the formation of crystals, i.e. salt crystals on the surfaces from the very beginning, so that crystal growth and inherent encrustations are not possible.

As has been shown, the invention process is particularly effective if the chemical substances used are organic phosphor compounds, especially phosphonates, phosphoric acid esters of higher alcohols and polyol phosphoric acid esters. However, compounds of acrylic acid, particularly polyacrylic amide, are effective also.

The concentration of the chemical substance added should preferably be a solution between about 5 and 50 $g/m^3$.

Moreover, the inventive process is particularly effective in connection with flue gas desulfurization plants in which desulfurization is effected by exchange of matter with an aqueous adsorption solution containing alkali or earth alkali ions, in such a way that the sulfur oxides contained in the flue gas first are oxidized to sulfide- to sulfate ions, subsequently are bonded to the alkali- or earth alkali ions, and the resulting insoluble salts are precipitated from the wash liquid. As this process generally employs saturated, partly, even supersaturated solutions, even smaller fluctuations in the procedure may lead to precipitation of such salts in the pipes and other apparatus parts. The process of the invention avoids these problems in a simple manner, with the added advantage that there is no interference with the chemical reaction of flue gas desulfurization process. The organic substance added is chemically neutral (pH 7.0) and thus does not in any way affect the pH values necessary for the chemical reaction in different locations of the desulfurization plant.

The invention is also very successful as applied to measuring devices which are to be immsersed into such solutions. Deposits on the surfaces of the device are prevented and adulteration of measured values avoided from the outset.

For further illustration of the invention, please refer to the schematic drawing, which relates to a pH value measuring device to be used in a flue gas desulfurization plant.

In the drawing, 1 is the analyzer, which at inlet 2 admits the liquid to be tested, discharging in at outlet 3. The measuring device consists of a sounding electrode 4, a glass tube containing an electrical wire which is in communication with the liquid by very small openings in the glass tube (not depicted). 5 designates the reference electrode to which the aqueous potassium chloride solution is fed from container 6. Additional electrode 7 serves as temperature compensator. Electrodes 4, 5, 7 are connected via amplifier 8 leading to regulator 9. Instead of regulator 9, a measuring device or data logger can be used for continuous recording of the values to be measured. Pipe outlet 10 is installed at inlet 2, through which outlet the chemical substance flows in from container 11 via pipe 12 and proportioning pump 13.

The substance forms a thin film on the surface of the reference electrode which serves to prevent growth of crystals on the surface. The organic substance normally consists of phosphoric acid compounds, polyol phosphoric acid esters or of acrylic acid compounds. The substance added to the liquid to be analyzed by means of proportioning pump 13, at the entrance to the analyzer, thus prevents deposits of crystalline matter present in the liquid in the analyzer. Such liquid may contain calcium- or magnesium salts, calcium sulfite, calcium sulfate, calcium carbonate or magnesium carbonate, magnesium sulfate or magnesium sulfite. Such deposits would lead to adulteration of the measured values caused by obstruction at the very small openings in the glass tube of the sounding electrode, and eventually to an interruption of the measuring process entirely, as the liquid to be measured loses electrical contact with the electrode in the interior of the glass tube. Moreover, if fluctuating pH values of liquids are to be measured, amplifier 8, as well as the regulator or data logger 9 would receive inaccurate values. By admixture of the organic substance in small amounts of about 5 to 50 $g/m^3$, encrustations of crystalline matter on the surfaces of the measuring device are prevented. The measured value is not adulterated by the substance added to the liquid. Standard potential is, now as before, aqueous potassium chloride solution entering electrode 5 from container 6.

Additional dispersing agents may be added to the solution. Such agents keep the precipitated crystal particles in suspension, preventing them from caking onto walls. Furthermore, precipitation of magnesium silicate, magnesium hydroxide or silicon oxide is avoided.

The admixture of organic substance from container 11 can be controlled by proportioning pump 13, adapting the flow of liquid through the measuring device to the content of the crystalline matter present in the liquid to be measured.

The invention is not restricted to the example shown but can be applied, among others, to inductive pressure transformers, windows of turbidimeters and densimeters which encompass passage of radioactive isotope radiation through the respective medium used.

What is claimed is:

1. Method for preventing the deposit of precipitated crystalline materials on the surface of measuring equipment receivers for equipment in power plant gas desulfurizing installations, whose measuring cell is flowed through by a material tending to crystallize out containing aqueous liquid for measuring the physical or chemical properties of this liquid, characterized by the fact that the liquid flowing to the measuring receiver has a chemical substance conducted into it which forms a thin protective film on the surface to be protected, and further characterized by feeding solution from a container to an electrode in the measuring cell and pumping the chemical substance by a proportioning pump into the liquid immediately before it flows into the measuring cell, and flowing liquid and the chemical substance in the measuring cell through small openings in a glass tube surrounding a second electrode in the measuring cell, said glass tube constituting a surface upon which the thin film is formed.

2. Method according to claim 1, characterized by pumping aqueous solution with dissolved chemical substance from a container into the aqueous liquid before it flows into the measuring cell, the dissolved chemical substance spreading in the aqueous liquid and a portion of that substance forming a thin protective film on the glass tube with small openings, preventing the small openings from being clogged by precipitated crystals.

3. Method according to claim 1 characterized by the fact that a dissolved chemical substance is upstreamly added to the aqueous liquid before that aqueous liquid reaches the measuring cell in the measuring equipment receivers, that dissolved chemical substance forming a thin film on the surface to be protected, especially on the surface of the measuring equipment receiver.

4. Method according to claim 3, characterized by the fact that organophosphates are provided as chemical substance.

5. Method according to claim 4, characterized by the fact that esters and other derivatives of phosphoric acid are used as organophosphates.

6. Method according to claim 4, characterized by the fact that phosphonates are used as organophosphates.

7. Method according to claim 4, characterized by the fact that polyol-phosphoric acid esters are used as organophosphates.

8. Method according to claim 3, characterized by the fact that compounds of polyacrylic amides are provided as chemical substance.

9. Method according to claim 3, characterized by the fact that the concentration of the chemical substance distributed in the aqueous liquid lies between about 5 and 50 g per $m^3$.

10. Method according to claim 3, characterized by the fact that the added organic substance is chemically neutral (pH 7.0).

11. Method according to claim 3, characterized by the fact that the chemical substance is pumped into the aqueous liquid flowing to the measuring receivers by a proportioning pump before the liquid enters the measuring cell.

* * * * *

UNITED STATES PATENT OFFICE
CERTIFICATE OF CORRECTION

Patent No. 4,284,513            Dated August 18, 1981

Inventor(s) Gerhardt Scholl, Freidrich Hofmann

It is certified that error appears in the above-identified patent and that said Letters Patent are hereby corrected as shown below:

On the Title page Item [73] Assignee should read:

Assignees: Saarbergwerke AG,
            Saarberg-Holter-Umwelttechnik GmbH,
           Herr Heinz Holter,
           Fed. Rep. of Germany.

Signed and Sealed this

Twenty-third Day of March 1982

|SEAL|

*Attest:*

*Attesting Officer*

GERALD J. MOSSINGHOFF

*Commissioner of Patents and Trademarks*